United States Patent
Krass et al.

(10) Patent No.: US 6,574,083 B1
(45) Date of Patent: Jun. 3, 2003

(54) ELECTRONIC EQUIPMENT INTERFACE WITH COMMAND PRESELECTION INDICATION

(76) Inventors: Allen M. Krass, 1318 E. Indian Mound Rd., Bloomfield Hills, MI (US) 48301; John G. Posa, 1204 Harbrooke Ave., Ann Arbor, MI (US) 48103

( * ) Notice: Subject to any disclaimer, the term of this patent is extended or adjusted under 35 U.S.C. 154(b) by 23 days.

(21) Appl. No.: 09/829,752

(22) Filed: Apr. 10, 2001

Related U.S. Application Data

(63) Continuation-in-part of application No. 08/963,712, filed on Nov. 4, 1997, now Pat. No. 6,215,417.

(51) Int. Cl.[7] ............................................. H04Q 1/00
(52) U.S. Cl. ...................................... 361/115; 341/176
(58) Field of Search ........................... 341/20, 21, 22, 341/176, 133; 348/162, 163, 164; 361/114, 115

(56) References Cited

U.S. PATENT DOCUMENTS

| | | | |
|---|---|---|---|
| 5,311,175 A | 5/1994 | Waldman | 341/22 |
| 5,594,469 A | 1/1997 | Freeman et al. | 340/825.22 |
| 5,889,506 A | 3/1999 | Lopresti et al. | 345/158 |
| 5,917,476 A | 6/1999 | Czerniecki | 345/157 |
| 5,936,611 A | 8/1999 | Yoshida | 345/158 |
| 6,037,882 A | 3/2000 | Levy | 341/20 |
| 6,215,417 B1 * | 4/2001 | Krass et al. | |

* cited by examiner

Primary Examiner—Edward H. Tso
(74) Attorney, Agent, or Firm—Gifford, Krass, Groh, Sprinkle, Anderson & Citkowski, PC

(57) ABSTRACT

A user input having a first mode of operation relating to the entry of a command is indicated on a display device prior to the actual execution of the command, after which a second mode of operation may be entered wherein the command is actually executed using the displayed information for confirmation purposes. In a preferred embodiment, the user input device takes the form of a hand-held remote-control unit, and the display is a television monitor. In this case, the invention is operative to determine the position of a user's finger relative to one or more keys of the keypad on the remote-control unit, and display, on the TV monitor, information relating to the user's relative position. For example, the display might show textual information relating to the pushbutton in closest proximity to the user's finger or, alternatively, the display may show a graphical representation of at least a portion of the keypad, along with an icon that moves relative to the graphical display in relation to movements made by the user. Embodiments of the invention facilitating use with conventional pieces of equipment such as television receivers are also disclosed.

6 Claims, 4 Drawing Sheets

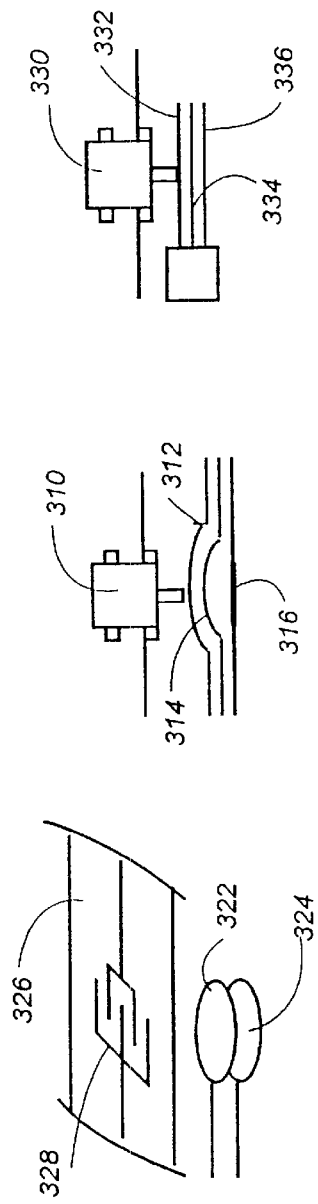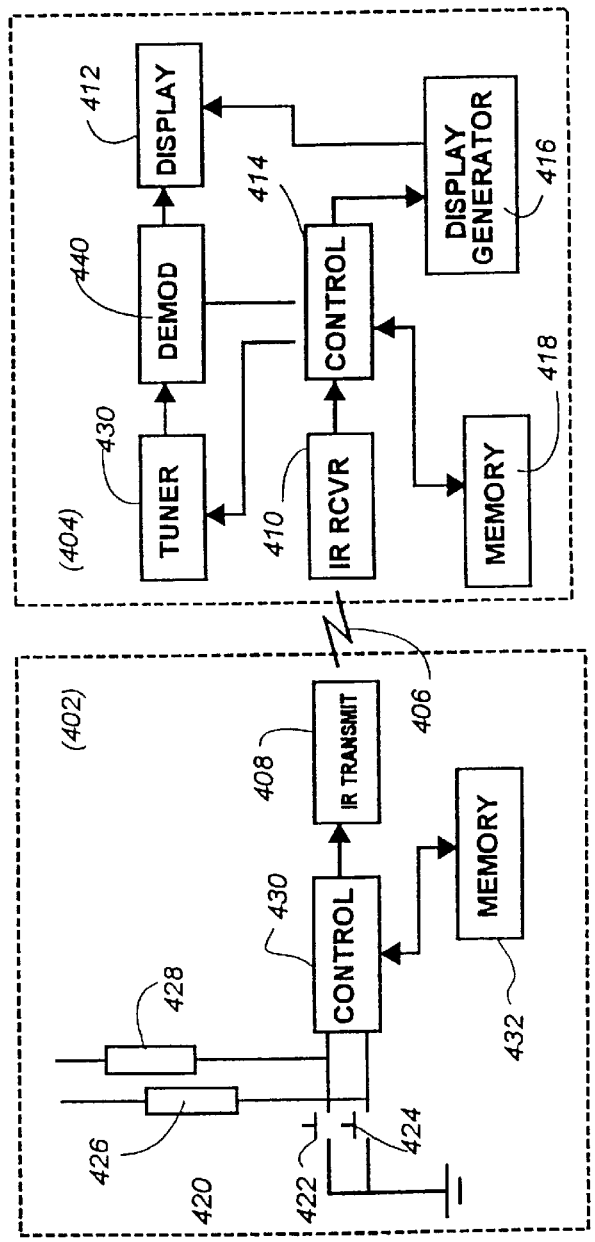

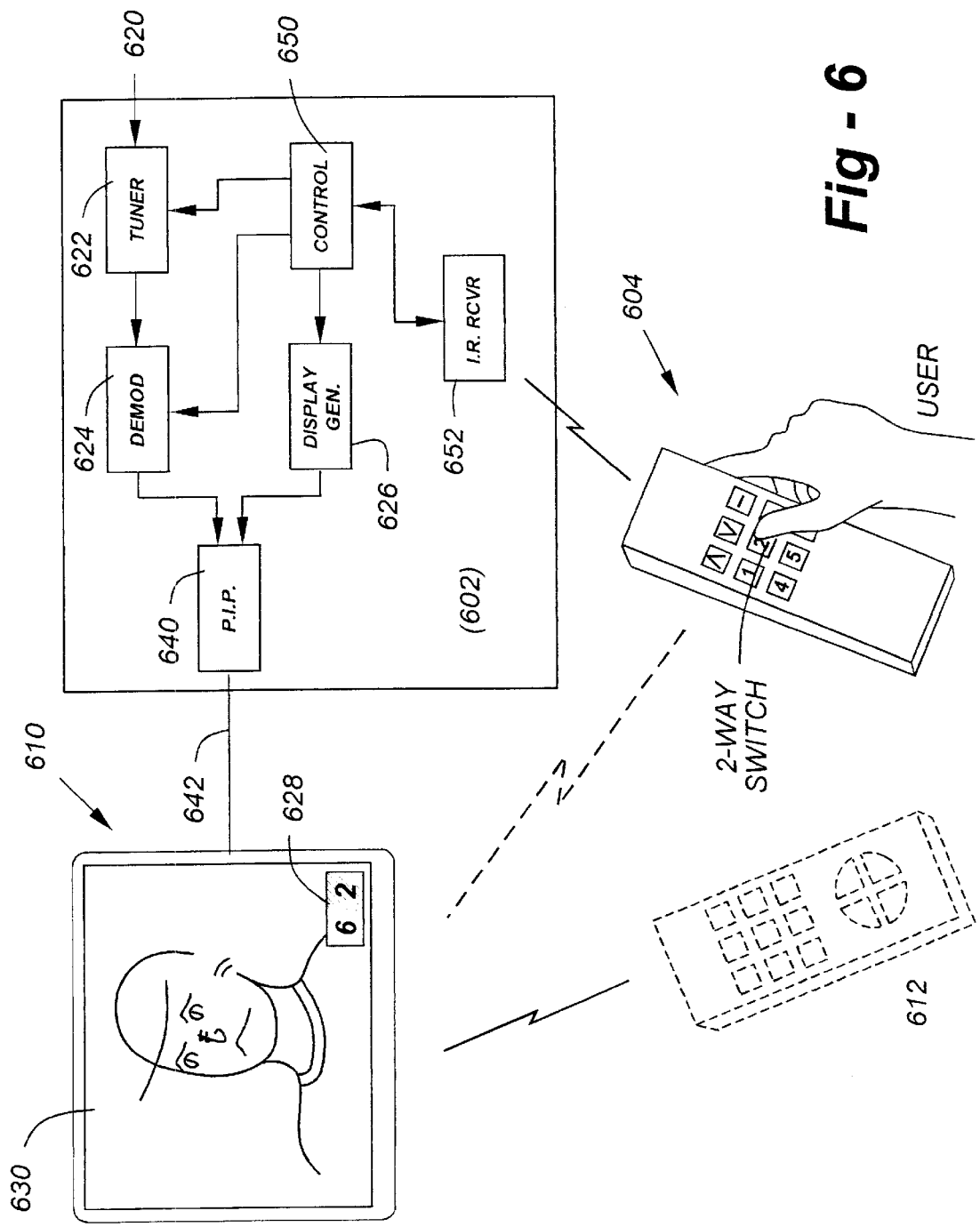

ELECTRONIC EQUIPMENT INTERFACE WITH COMMAND PRESELECTION INDICATION

REFERENCE TO RELATED APPLICATION

This application is a continuation-in-part of U.S. patent application Ser. No. 08/963,712, filed Nov. 4, 1997 now U.S. Pat. No. 6,215,417, the entire contents of which are incorporated herein by reference.

FIELD OF THE INVENTION

The present invention relates generally to person/machine interfaces and, more particularly, to an operator input including a pre-execution confirmation mode of operation.

BACKGROUND OF THE INVENTION

It is often the case that users of electronic equipment enter incorrect commands because they cannot see an associated input device, or must look elsewhere during command entry. It is for this reason that typists must memorize the keyboard, since they are typically required to view a display instead. Fortunately, for typists, the display itself provides feedback as to incorrect entries, enabling the typist to backspace and make appropriate corrections.

There are other situations, however, wherein an operator is unable, or does not wish to memorize the input device, and must therefore refer to the input device to minimize incorrect entries. One example is the familiar hand-held remote-control unit supplied with audio/video equipment. Particularly during nighttime usage, the user of such a device is unable to see the keypad, leading to incorrect entries. This invention is directed toward alleviating such problems.

SUMMARY OF THE INVENTION

In an operator control arrangement including a display device, the present invention provides a user input having a first mode of operation wherein information relating to the entry of a command is indicated on the display device prior to the actual execution of the command, and a second mode of operation wherein the command is actually executed using the displayed information for confirmation purposes.

In a preferred embodiment, the user input device takes the form of a hand-held remote-control unit, and the display is a television monitor. The invention is operative to determine the position of a user's finger relative to one or more keys of the keypad on the remote-control unit, and display, on the TV monitor, information relating to the user's relative position. For example, the display might show textual information relating to the pushbutton in closest proximity to the user's finger or, alternatively, the display may show a graphical representation of at least a portion of the keypad, along with an icon that moves relative to the graphical display in relation to movements made by the user.

The invention therefore enables the operator of a user input device to view, on a display device, the command which will be executed should the user take further action, but before such action is actually taken, thereby essentially guaranteeing that the correct command will be entered. In one embodiment of the remote-control unit, as the user's finger hovers over the keypad, the display will change to indicate which key will be depressed, and therefore which command will be entered, should the operator perform a key depression at a particular time.

The equipment to be controlled with the user input need not be the same equipment incorporating the display used for visual confirmation, but instead, the user input for one piece of equipment may use the display of a different piece of equipment. For example, in an entertainment setting, a single video monitor may be used to indicate the status of input devices associated with various pieces of equipment such as tape or disk player, cable boxes, audio tuners, amplifiers, and so forth.

Various technical approaches may be used to sense the position of the user relative to the input device. For example, one or more pushbuttons may be provided with multiple leaf switches or electrically conductive membranes, such that an initial, slight depression of the key will bring about a first electrical contact, and, subsequent to a confirmation of the displayed command, a further depression of the same key will bring about a second electrical contact, resulting in the execution of the command.

In an alternative configuration, the outer surface of particular pushbuttons may be provided with a capacitive touch sensor, enabling the position of the user relative to these keys to be sensed without the user having to actually perform an initial depression of a key. The implementation of the invention may be limited to the most commonly used commands. For example, in an entertainment control environment, only commonly used pushbuttons such as numeric keypads or volume control may be provided with dual-mode activation according to the invention, with the other controls being conventional. Embodiments of the invention facilitating use with conventional pieces of equipment such as television receivers are also disclosed.

BRIEF DESCRIPTION OF THE DRAWINGS

FIG. 3A is a cross-sectional drawing of a pushbutton including a capacitive touch sensor operative to support two modes of operation according to the invention;

FIG. 3B is an alternative embodiment of a dual-mode switch including double, electrically conductive membranes;

FIG. 3C represents yet a further, alternative dual-mode switch incorporating a plurality of electrically conductive leaf springs;

FIG. 4 is a block diagram depicting electrical circuitry used in implementing the invention; FIG. 6 is a block diagram of a further embodiment of the invention including a dedicated remote-control unit for basic functions.

DETAILED DESCRIPTION OF THE INVENTION

Figure 1:
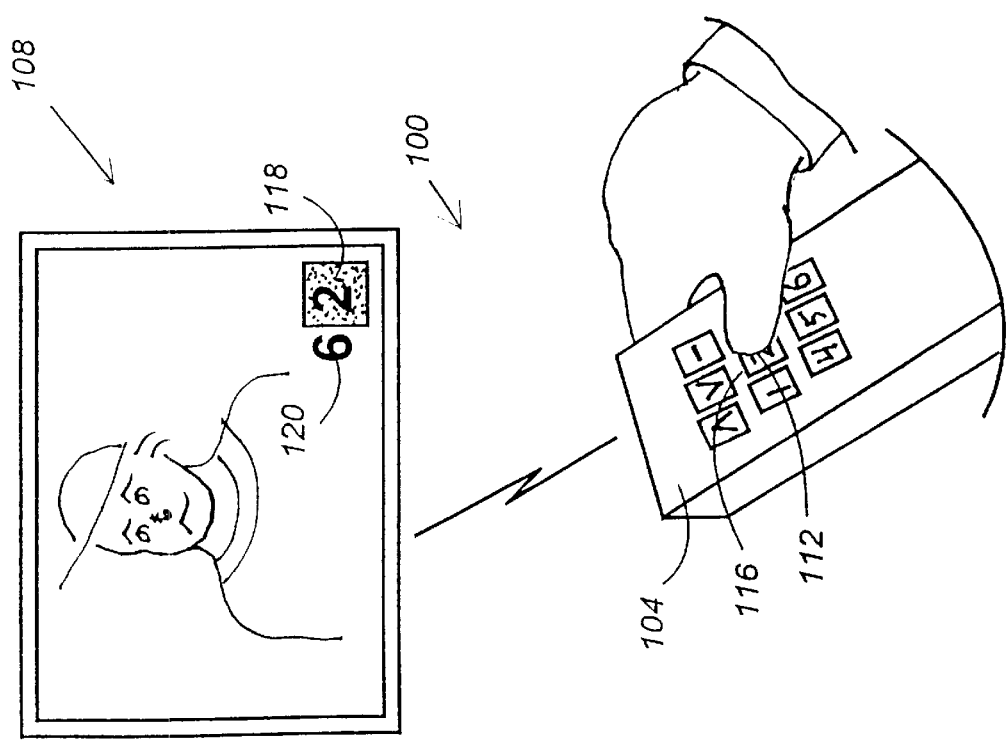
FIG. 1 illustrates, from an oblique perspective, a hand-held remote-control input device including the capability of displaying the position of a user's finger relative to a keypad on an associated video monitor.

In FIG. 1 there is shown generally at 100 an embodiment of the invention including a hand-held remote-control unit 104 in wireless communication with a video monitor 108. In this case, the thumb 112 of an operator has initiated a first mode of operation with respect to the "2" key 116, causing a "2" (118) to appear on the screen of the monitor 108. The "6" (120) appearing on the screen is indicative of the fact that the operator had previously entered a "6" through a second, command-execution mode of operation with respect to that key.

In this embodiment, some type of visual indicator is preferably utilized to show that a particular entry is in the first or confirmatory mode of operation awaiting actual entry. For example, in FIG. 1, the display of the digit "2" (118) on the screen may be contained in a block of blinking reverse video or other appropriate graphical representation to indicate that the operator will enter a "2" through further depression of the "2" key, at which time the reverse video will terminate and the "2" numerical command will actually be entered. In this particular case, it will cause the execution of channel-change command channel 62.

Although FIGS. 1 and 4 illustrate the use of a wireless link between a dual-mode user input and display device, a hard-wired connection between the user input and the display may alternatively be utilized, and although pushbuttons are discussed herein, other input devices such as trackballs, slide switches, rotary knobs and other controls are well within the scope of the invention. In addition, although certain of the figures might imply that the user input and display form the same piece of equipment (a remote-controlled television, for instance), the user input may, in fact, be used to control a different piece of equipment, with the display of a television, for example, being conveniently used for temporary display purposes only.

Figure 2:
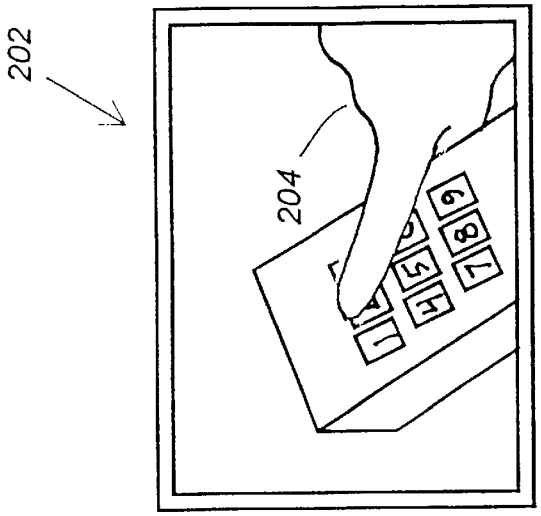
FIG. 2 is a drawing of an alternative screen display according to the invention.

FIG. 2 illustrates at 202 an alternative confirmatory display according to the invention, wherein a facsimile of the user-input device is generated along with an icon 204 representative of the user. Such graphical icons would be preferably generated automatically when the user comes within close physical proximity to the input device. In this case, the user's finger (or thumb) has come in close physical proximity to the "2" key of a remote unit, as shown in the lower portion of FIG. 1, causing the graphical representation 202 of the remote to appear along with the graphical representation of a user, including a finger hovering over the "2" key as shown, indicating that if the user continues to depress that key, a "2" will be entered.

FIGS. 3A–3C illustrate alternative approaches to the implementation of dual-mode pushbuttons according to the invention. In FIG. 3A, a pair of spaced-apart electrodes 322 and 324 are used to bring about the second, execution mode associated with the switch, and above these electrodes there is a membrane 326 having a capacitive touch sensor 328 in alignment with the electrodes 322 and 324. When the user comes within sufficient physical close proximity to the touch sensor 328, the first or confirmatory mode of operation will be initiated and with a further downward depression, the electrodes 322 and 324 will make electrical contact, effectuating the second, execution mode of operation for that switch.

FIG. 3B illustrates an alternative two-mode switch wherein a first pair of spaced-apart electrodes 312 and 314 make initiate contact through the downward action of an upwardly-biased pushbutton 310. Preferably, the material onto which the upper electrode 312 is applied is sufficiently pliable that even a slight downward pressure will cause electrodes 312 and 314 to make electrical contact. With a further downward, somewhat more aggressive depression of the button 310, however, electrode 314 will make contact with a lower electrode 316, thus executing the second mode of operation.

As an alternative to membranes having electrically conductive areas, FIG. 3 illustrates how leaf switches may be used together, or instead of the other approaches just described. In this case, the initiate downward motion of an optional pushbutton 330 causes electrical contact to occur between leaf springs 332 and 334, thus bringing about the first mode of operation, whereas a further downward depression causes contact between leaf spring 334 and 336, executing the operation indicated through the first, confirmatory mode.

FIG. 4 depicts, in block-diagram form, major electrical functional units associated with implementing the invention in a remote-controlled television arrangement. For the sake of clarity, subsystems not germaine to the invention have been left out of this figure, with the understanding that such additional functionality is not precluded by the invention. In the embodiment shown, a hand-held remote-control unit 402 communicates with a display 404, preferably through the use of an infrared signal 406 from a transmitter 408 in the remote 402 and a receiver 410 associated with the display.

A dual-mode user input is shown generally at 420 in the form of an upper switch 422 used to bring about the first, confirmatory mode of operation and a lower switch 424 used for the actual execution of the command associated with the user input 420. The broken line 426 is used to indicate that the switches are in vertical, physical alignment with one another but not meant to imply that both switches need to have moving parts, as in the case of the capacitive touch sensor of FIG. 3A. The switches, which cause a ground contact when activated, may be held to a logical high state using pull-up resistors 428, as is typical, and may be scanned by a controller 430, which is preferably a microprocessor or single-chip microcomputer of conventional design. A memory 432 may optionally be used, as necessary, to store remote-control codes, for example, in the event that the controller 430 is not equipped for such purpose.

In the display unit 404, a separate controller 412 is preferably used in conjunction with various other components to cause the display of textual and/or graphical information on display 412 in conjunction with the confirmatory mode of operation of the input 420. A separate controller 414 may be used to coordinate operations, receiving information from the infrared receiver 410, and causing the textual and/or graphical information to be routed from a display generator 416 to the display 412. An auxiliary memory 418 may be used, for example, for control-code look up or other purposes.

In the event that the display unit 404 forms part of a television, appropriate tuner (430) and demodulator (440) circuits may be provided to cause the display of television programming on the display 412. If the display unit 404 is a monitor only, or forms part of a non-television piece of equipment such as a computer, tuning and demodulation circuits would not be required.

Figure 5:
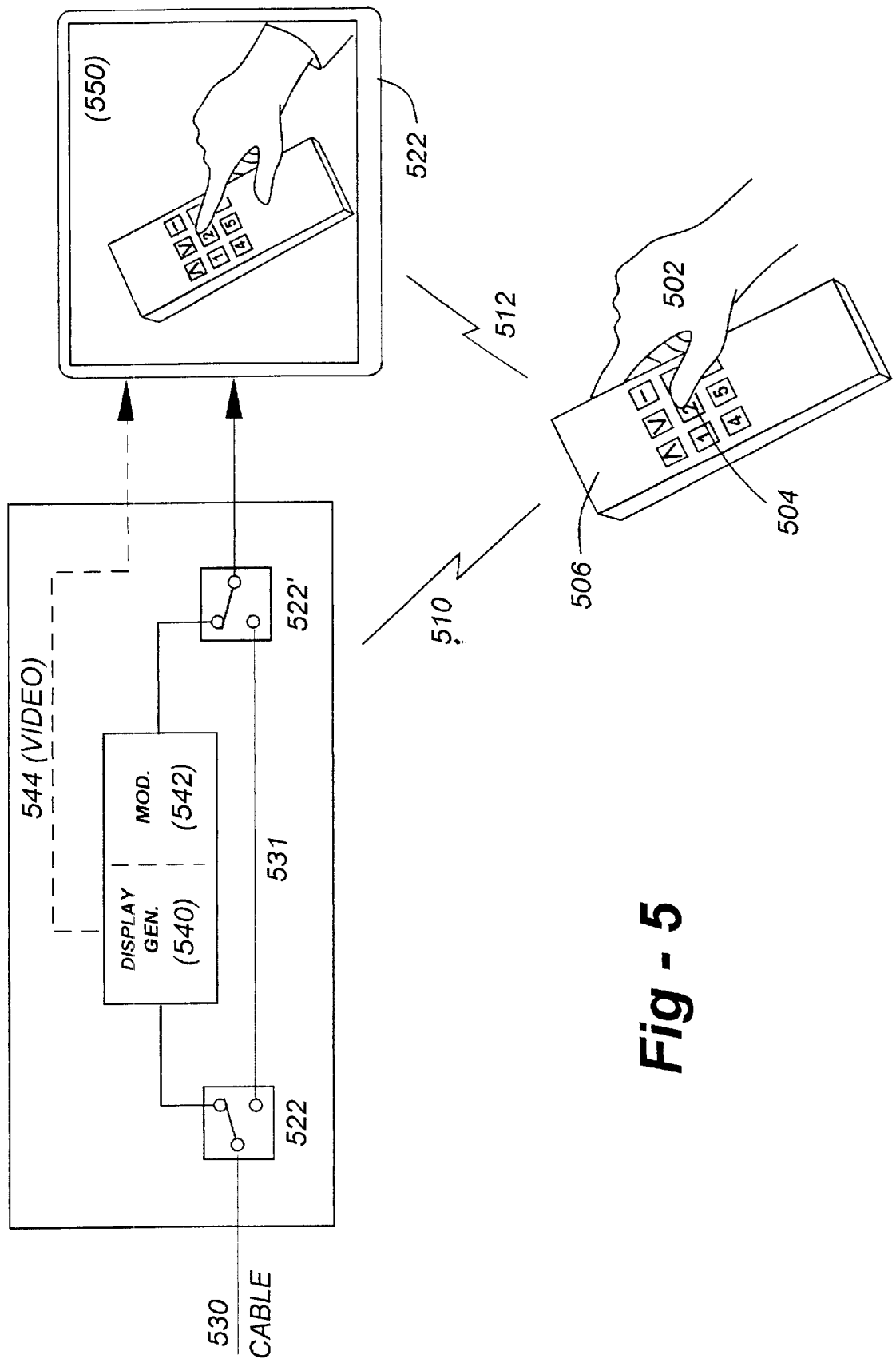
FIG. 5 is a block diagram of an embodiment of the invention facilitating use with an unmodified television receiver.

Although the preferred embodiments of the invention are best incorporated directly into a display device, television receiver or other piece of equipment, FIGS. 5 and 6 illustrate embodiments of the invention wherein a separate piece of equipment or "set-top box" may be used in conjunction with conventional hardware, including television receivers. In FIG. 5, a user 502 is depressing a multi-state button 504 on a remote-control unit 506 provided according to the invention. The multi-state button 504, includes a first switch to confirm the identity of a command associated with that key, and a second switch being operative to execute the command through a further depression or other technique described herein. Upon activation of the first switch or entry of the first state, a wireless signal 510 is sent to a unit 520 according to the invention, which causes the incoming video feed or cable line 530, to be switched from a through-path 531 to the insertion of a display generator 540 through switches 522 and 522'. The display generator 540 in unit 520 causes a picture 550 to be displayed on the display unit 552, enabling the user 502 to confirm the identity of a command prior to execution. Although a facsimile of the remote unit 506 is displayed at 550, numbers, letters or other indicia may be used in the pre-execution state.

Assuming the display 550 confirms a command desired to be executed by the user 502, a further depression or other activation of the switch 504, causes a second command 512 to be sent to the display unit directly, thereby executing that particular command, be it a volume-up command, channel change, numerical entry, or otherwise. Thus, according to this embodiment, the unit 506 provided by the invention must not only include the capability of sending a wireless signal 510 to the separate unit 520 to effectuate a display on device 552, but it must also learn at least a subset of the commands of the unit 552 to enable the actual execution of a command upon entry of the second or execution state. Note, further, that although switches 522 are RF switches in the sense that the cable signal itself is bypassed by display generator 540 using RF switches, as an alternative, a channel may be demodulated to baseband, with display generator 540 generating a display at baseband video, which may either be fed into the video input of the device 552, or modulated back onto the RF line 532.

FIG. 6 illustrates generally at 602 a more sophisticated embodiment of the invention facilitating use with a conventional piece of equipment such as television receiver 610. In contrast to the arrangement of FIG. 5, however, the embodiment of FIG. 6 not only facilitates a picture-in-picture display of a pre-execution key or command, in addition, the remote 604 allows certain basic commands such as volume/channel changes and numerical input, to be executed directly by the unit 602, such that additional commands for the device 610 need not be learned by the remote 604. In this case, a separate remote 612 would preferably be provided, which a user would need to resort to for more complex operations such as menu/set-up, contrast/brightness, and other controls.

In unit 602, an incoming video line 620 is fed to a tuner 622 and demodulator 624. A display generator 626 is used to generate a display 628 on the screen of the device 610, enabling a channel 630 to be viewed outside of the confirmatory area 628. The display generator 626 is merged with the demodulated channel signal through a PIP generator block 640, which is transferred along path 642 to the device 610 to show both the channel 630 and inset 628. A controller 650 is responsible for coordinating all of the functions of the unit 602, including commands received through infrared receiver 652. Since the unit 602 includes a tuner and demodulator 624, the hand-held unit 604 may include at least a limited set of buttons such as volume/channel change, and numerical channel keypad entries, enabling the unit 602 to perform these functions directly without having to learn separate codes for the unit 610. For additional, more sophisticated functions of the unit 610, the device 604 may either learn those codes or be pre-programmed with such codes, preferably through an on-screen programming procedure, or a separate unit 612 may be provided for more sophisticated functions, as discussed with reference to FIG. 5.

We claim:

1. Reduced-error command-entry apparatus for use with a display device, comprising:
    a hand-held remote control unit physically separate from the display device, the remote unit including a keypad having a plurality of keys, wherein at least one of the keys is coupled to first and second electrical switches, with the first switch being used to confirm the identity of a command associated with that key, and the second switch being used to execute that command; and
    a physically separate associated unit in electrical communication with the display device, the associated unit including display generation circuitry operative to display, upon activation of the first switch, a visual representation of at least a portion of the keypad, including the key coupled to the first and second switches, enabling a user to confirm the identity of the command prior to the activation of the second switch.

2. The apparatus of claim 1, wherein the display device forms part of a television.

3. The apparatus of claim 1, wherein key coupled to the first and second switches is a numerical key.

4. The apparatus of claim 1, wherein the first switch is a touch sensor on the surface of the key.

5. The apparatus of claim 1, wherein the second switch is activated by a continued depression of the key.

6. The reduced-error command-entry apparatus of claim 1, further including the generation of a first wireless signal to the associated unit for displaying the visual representation and a second first wireless signal for executing the command.

* * * * *